UNITED STATES PATENT OFFICE.

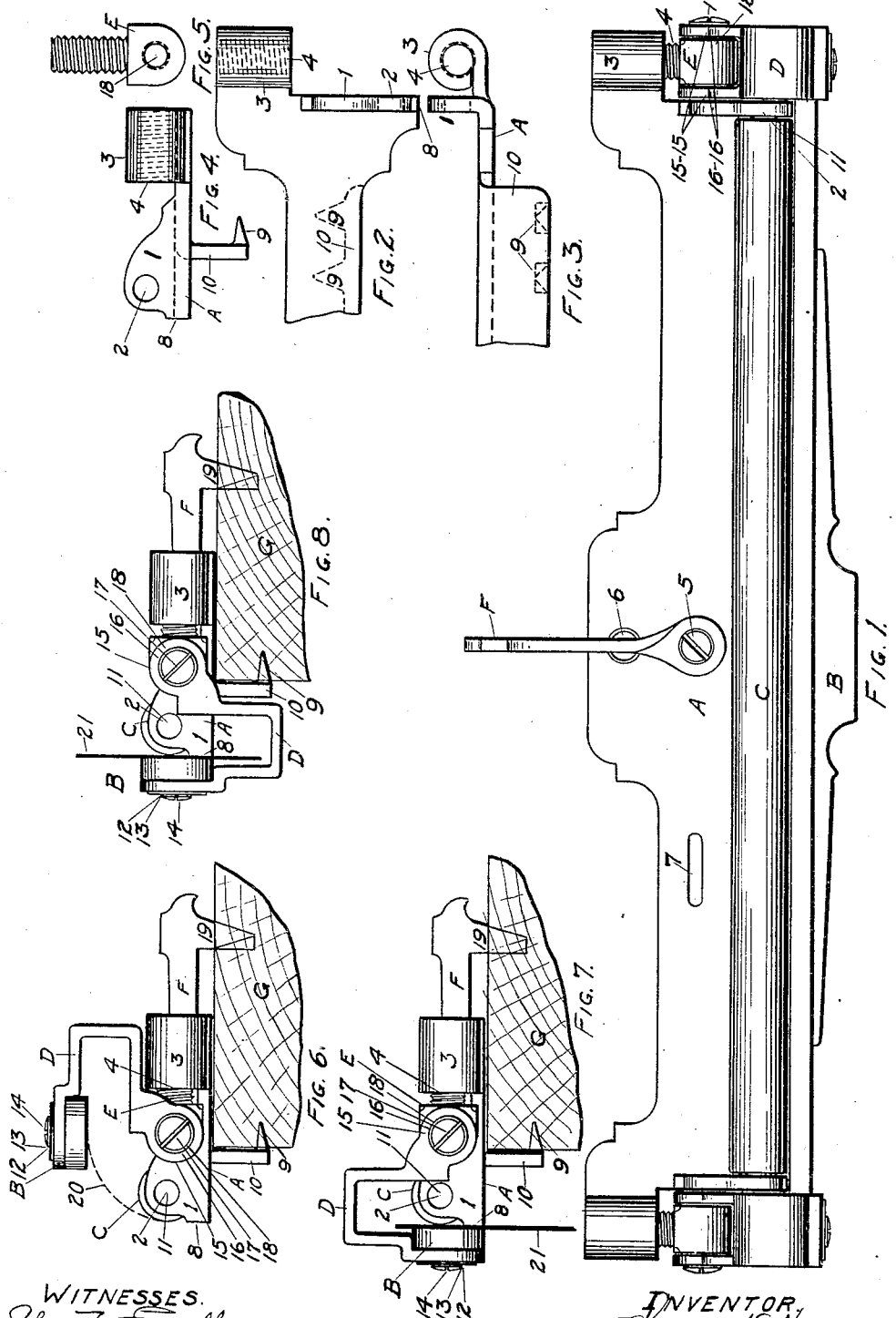

CHARLES H. SPRAY, OF INDIANAPOLIS, INDIANA.

SAW-CLAMP.

1,042,049.  Specification of Letters Patent.  Patented Oct. 22, 1912.

Application filed March 23, 1912. Serial No. 685,654.

*To all whom it may concern:*

Be it known that I, CHARLES H. SPRAY, a citizen of the United States, residing at Indianapolis, in the county of Marion and State of Indiana, have invented a new and useful Saw-Clamp, of which the following is a specification.

My invention relates to improvements in saw clamps, which are used in filing, setting and jointing hand saws, and the objects of my improvement are; first, to provide a tool light and compact, so it may readily be carried in a tool kit; second, to clamp the saw blade near its cutting edge with its teeth in close proximity to the clamping bars while being filed sharp; third, to clamp the saw at its back, in order that its teeth may be stroked with a file to an even length from end to end of the blade and that the setting tool may have unobstructed access to the teeth; fourth, to provide means for adjustment of clamping effect upon the saw blade between the clamping jaws; fifth, to provide means for resilient spring clamping effect of the clamping bars upon the saw blade; sixth, to provide means for stopping the clamping bars in proper relation with each other in a clamped position upon the saw blade and, seventh, to provide automatic clamping effect of the clamping bars upon the saw blade, by the simple manipulation of one of the bars.

I attain these objects by the mechanism illustrated in the accompanying drawings in which, Figure 1 is a plan view of the entire clamp, positioned as if it were fastened to a support ready to be used; Fig. 2 is a plan view of a section of base plate A, showing the plate in same position as it is shown in Fig. 1; Fig. 3 is a front elevation of the section of base plate A shown in Fig. 2; Fig. 4 is an end elevation of the base plate A; Fig. 5 is a side view of pivot arm E, as it is viewed in Figs. 6, 7 and 8, and its edge view is shown in Fig. 1; Fig. 6 is an end elevation of Fig. 1, showing the clamp open, ready to receive the saw in a manner to be gripped at its cutting edge; Fig. 7 is an end elevation of Fig. 1, showing the clamp closed and gripping the saw blade 21 near its cutting edge; Fig. 8 is an end elevation of Fig. 1, showing the clamp closed and gripping the saw blade 21 at its back, thus furnishing unobstructed access to the entire cutting edge of saw blade.

In Figs. 1, 6, 7, and 8, the bars B. and C. constitute a pair of clamping jaws, each separately and pivotally connected to a base plate A. preferably in the following manner;—The base plate A. is provided at each of its ends with a lug 1, carrying a hole 2; the bar C. is provided at each of its ends with a pivot 11. These pivots 11 engage the holes 2, and form a pivotal means of connection between the bar C. and base plate A. at each end of the clamp.

The base plate A. is further provided at each of its ends, with a lug or eyelet 3, carrying a threaded hole 4. A pivot arm E. is connected to each eyelet 3 by means of the screw threaded end of the arm E. operating in the screw threaded hole 4, in the eyelets 3; and the pivotal or swivel facilities the arms E. have in operating in the holes 4, are further used as a swivel joint between the arms E. and base plate A. for the purposes described later on.

The threaded connecting means between arms E. and eyelets 3, are further utilized as a means of adjustment between the bars B. and C. to produce more or less clamping effect of the bars upon the saw blade as will be described later on. To the free end of each arm E. is connected an arch D. by means of a pivot engaging the hole 18 of the arm, and the holes 16. 16 in the eyelets 15. 15 with which the arches are provided, thus forming a pivot joint between the arches D. and arms E. for the purpose described later on. The arches D. are further provided with a hole 13, and on each of these arches is then pivotally mounted a corresponding end of a bar B. by means of a pivot engaging the hole 13 in the arches D. and a hole 12 in the bar B; and by the combined pivotal means of connection, first, between bar B. and arches D., second, between arches D. and arms E., and third, between arms E. and eyelets 3, I attain a universal swivel joint in the means of connection between the base plate A. and bar B. at each end of the clamp, for the use and purpose described later on. It will be noted that the manner of construction of the universal swivel joint, referred to, might be varied to the same purpose, but I prefer the manner of construction described.

The purposes of the universal swivel joints above referred to, are first, that through its connecting means with base plate A. and acting on pivots 17 at each end of the clamp, the bar B. may be moved from the unclamped position shown in Fig. 6 to the clamped position with bar C. as shown in Figs. 7 and 8, and second, that the arches D. operating on pivots 14 and on swivel joint between arms E. and eyelets 3, may be turned to the position as shown in Fig. 7, to grip the saw blade 21 at its cutting edge with its teeth in close proximity to the clamp bars for filing purposes; or that the arches D. may be turned to the position shown in Fig. 8, gripping the saw 21 at its back, in this instance, to provide for unobstructed access to the full cutting face of the saw, for jointing and setting purposes.

It will be noted in the operation of the clamp that the bar B. acting through its means of connection with base plate A. on pivots 17, may be moved from the unclamped position shown in Fig. 6, to the clamped or closed position with the bar C. as shown in Figs. 7 and 8. It will be noted in Fig. 6 that in the movement of the bar B. on its pivots 17, it falls into bare touching contact with bar C. in the arc line 20 at its inside vertical center when the two bars meet in position shown in Figs. 7 and 8; whereas its lower inside edge moves in an arc line of considerably longer radius than the radius of the arc line 20, shown in Fig. 6.

A clamping effect of the bars B. and C. upon the saw blade is provided by the adjusting means of the threaded stems of the arms E. operating in the threaded holes 4; the means of connection between the bar B. and base plate A. may be shortened by causing the arms to enter the holes 4 to a greater amount, until the lower inside edge, instead of its inside vertical center of the bar B., moves in the arc line 20 shown in Fig. 6; by this adjustment the lower inside edge would fall into first contact with bar C., and if the bar B. is then forced down over the face of bar C., the latter bar would revolve on its pivots 11, from point of first contact, until the two bars are seated upon the saw blade in a locked position shown in Figs. 7 and 8,—the pivotal movement of bar C. eliminating any friction between the two bars. By reason of the overreaching distance of the lower edge of the bar B. being greater than its vertical inside center from pivots 17 upon which it moves, the saw is automatically clamped between the two bars B. and C. by the movement of the former bar from the open position shown in Fig. 6, to the closed position shown in Figs. 7 and 8.

It will be noted that after the bars have taken the locked position shown in Figs. 7 and 8, the bar B. might continue in its course around the bar C. and thus the bars disengage themselves again. In order to prevent this a stop jaw 8 is provided at each end of the clamp, which protrudes into the arc line movement of bar B. and prevents movement of the bar to more than the locked position shown in Figs. 7 and 8. It will further be noted that it is necessary for the overreaching distance between the bar B. and its pivots 17 to vary, in order to provide for saw blades of varying thicknesses and to allow it to pass over the protrusions of bar C. in its track of movement. For this purpose, and that the bars B. and C. may have resilient spring clamping effect upon the saw blade, the arches D. are constructed with means of spring action, said arches being preferably made of spring steel. The base plate A. is provided with a downward projecting flange 10, embodying one or more spurs 9, at each of its ends, projecting inwardly toward a clamp support G., and having a hole 6, a hole 7, and a pin or stud 5. The object of the hole 6. is that by means of a wood screw inserted therein, and spurs 9, the clamp may be permanently fastened to a support G. The purpose of the stud 5. is that a dog F. may be loosely connected thereto, and by means of base plate A., flange 10, spurs 9, and dog F., I attain a portable means of attachment for the clamp to a support. The dog having the facilities to draw and hold the clamp firmly,—the base plate acting as a brace against the tension of the dog to draw the clamp over in a rolling position which would disengage spurs 9. Reference is had to Patent Number 854,540 granted this petitioner May 21, 1907. The purpose of the slotted hole 7 is that the fang 19 of the dog F. may be inserted in this hole to hold the dog in folded position when the clamp is not in use.

I claim,

1. The combination in a saw clamp of a base plate A., having connected to said base plate a bar B. by pivotal means, embodying a universal swivel connection at each end of the clamp, and having further connected to said base plate, a bar C., by pivotal means, as substantially set forth and for the purposes specified.

2. The combination in a saw clamp of a base plate A., embodying a lug 3 at each of its ends; having pivotally connected to each of said lugs 3 an arm E., having pivotally connected to the free end of each arm E. and arch D., and having pivotally connected to each arch D. a corresponding end of a bar B.,—the arches D. having a capacity of spring action, and said base plate A having further connected thereto, by pivotal means a bar C., as fully set forth and for the purposes specified.

3. The combination in a saw clamp of a base plate A., embodying a stop jaw 8 at each of its ends, having connected to said base plate by pivotal means, a bar B; said pivotal means of connection embodying a universal swivel connection at each end of the clamp, said base plate having further pivotally connected thereto a bar C., all as fully set forth and for the purposes specified.

4. The combination in a saw clamp of a base plate A., embodying a stop jaw 8 at each of its ends, having connected to said base plate a bar C. by pivotal means, and having further connected to said base plate a bar B. by pivotal means; said means of connection between plate A. and bar B. embodying a universal swivel connection at each end of the clamp; said bars B. and C. being arranged to automatically engage each other in a clamping position upon the saw blade by the movement of bar B. on its pivots, in combined pivotal action of the bar C., as fully set forth and for the purposes specified.

5. The combination in a saw clamp comprising a pair of clamping jaws, B. and C., each separately and pivotally connected to a base plate A., the means of connection between bar B. and said base plate A. including pivotal means of action of the arches D. upon the pivots 14, and pivots formed through the action of arms E. in the threaded holes 4. in eyelets 3, as fully set forth and for the purposes specified.

6. The combination in a saw clamp, having a base plate A; said base plate embodying a stop jaw 8 at each of its ends, having connected to said base plate A. a bar C. by pivotal means, and having connected to said base plate A. a bar B. by pivotal means; said means of connection between base plate A. and bar B. being provided, first, with a universal swivel joint connection at each end thereof; second, with adjusting means between the clamping bars B. and C., and third, with resilient spring clamping means between the clamping bars B. and C., and the bars B. and C. being arranged to move into clamping position, one with the other upon the saw blade automatically, by the movement of the bar B. on its pivots, and the movement of the bar C. on its pivots, as fully set forth and for the purposes specified.

CHARLES H. SPRAY.

Witnesses:
JOHN F. ENGELKE,
JAMES E. ROCAP.

Copies of this patent may be obtained for five cents each, by addressing the "Commissioner of Patents, Washington, D. C."

Correction in Letters Patent No. 1,042,049.

It is hereby certified that in Letters Patent No. 1,042,049, granted October 22, 1912, upon the application of Charles H. Spray, of Indianapolis, Indiana, for an improvement in "Saw-Clamps," an error appears in the printed specification requiring correction as follows: Page 2, line 118, for the word "and," first occurrence, read *an;* and that the said Letters Patent should be read with this correction therein that the same may conform to the record of the case in the Patent Office.

Signed and sealed this 3rd day of December, A. D., 1912.

[SEAL.]                          C. C. BILLINGS,

*Acting Commissioner of Patents.*